United States Patent [19]

Renfrew

[11] Patent Number: 4,956,753
[45] Date of Patent: Sep. 11, 1990

[54] LAMP ASSEMBLY

[75] Inventor: Andrew B. Renfrew, Sutton Coldfield, United Kingdom

[73] Assignee: Lucas Industries, plc, Birmingham, England

[21] Appl. No.: 116,835

[22] Filed: Nov. 5, 1987

[30] Foreign Application Priority Data

Nov. 5, 1986 [GB] United Kingdom ............... 8626437

[51] Int. Cl.$^5$ .................................. B60Q 1/52
[52] U.S. Cl. ................................. 362/74; 362/219; 362/238; 362/240; 362/249; 362/368
[58] Field of Search ............. 362/74, 217, 219, 227, 362/238, 240, 249, 250, 368, 801, 237

[56] References Cited

U.S. PATENT DOCUMENTS

| | | | |
|---|---|---|---|
| 4,189,709 | 2/1980 | Gosswiller | 362/219 |
| 4,302,800 | 11/1981 | Pelletier | 362/250 |
| 4,447,859 | 5/1984 | Raczynski | 362/250 |
| 4,543,622 | 9/1985 | Menke et al. | 362/219 |
| 4,620,268 | 10/1986 | Ferenc | 362/74 |
| 4,722,030 | 1/1988 | Bowden | 362/74 |
| 4,812,955 | 3/1989 | Beswick et al. | 362/240 |

Primary Examiner—Ira S. Lazarus
Assistant Examiner—Sue Hagarman
Attorney, Agent, or Firm—Fleit, Jacobson, Cohn, Price, Holman & Stern

[57] ABSTRACT

A lamp assembly suitable for use on a vehicle roof includes an elongate support member (11) of hollow cross section and a plurality of individual lamp units (12–17) secured to the support member at points spaced along the length of the support member. Electrical connecting leads (37) of the lamp units are disposed in the hollow interior section of the support member (11) and the lamp units (12–17) each comprise a body (31, 31a) housing the lighting assembly of the unit and having opposite ends closed by closure members (32) at least one of which is transparent. The closure members (32) of all of the lamp units (12–17) of the assembly are of similar shape, and the lamp unit bodies are of the same cross-section.

20 Claims, 3 Drawing Sheets

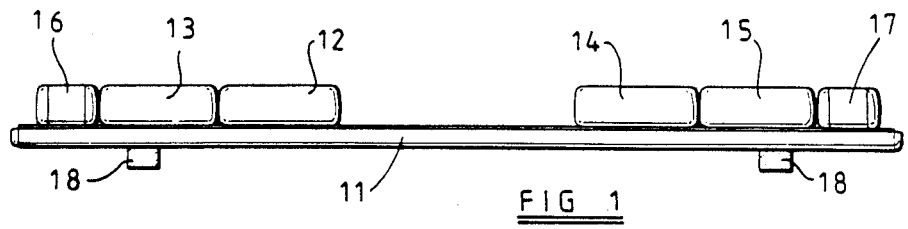
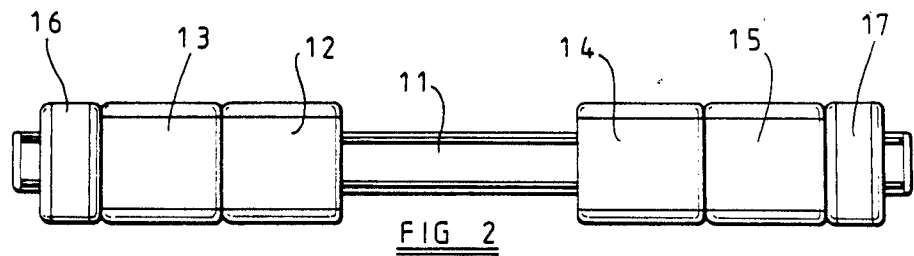
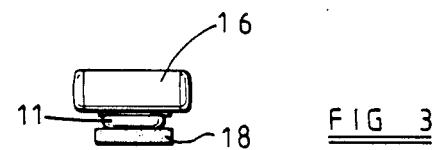
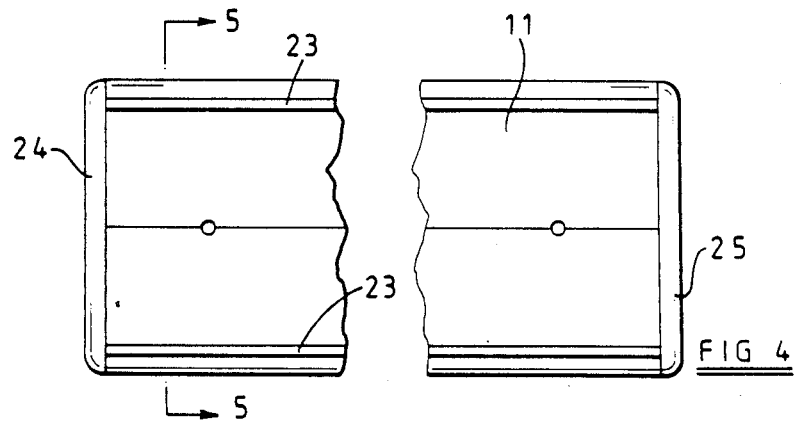
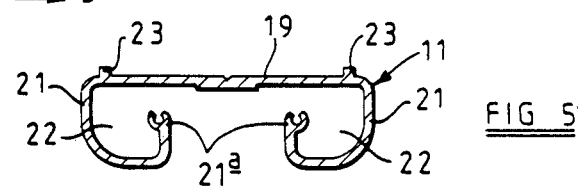

LAMP ASSEMBLY

BACKGROUND OF THE INVENTION

This invention relates to a lamp assembly particularly but not exclusively for mounting on the roof of a vehicle.

It is known for emergency vehicles, for example police vehicles, to carry a roof mounted lamp assembly consisting of a support bar which extends transversly of the vehicle and a plurality of lamp units secured to the support bar. In the case of police vehicles the lamp units usually include one or more blue flashing units, often in addition to units of different color and style. In known arrangements, while lamp units of the same color may be of the same design, units of different color are often a different design and the assembly has the appearance of a collection of unrelated lamp units. Moreover, in order to construct and/or service such assemblies it is necessary to stock a variety of different lamp units.

British patent application No. 2154310A shows an attempt to improve upon the concept of roof mounted lamp assemblies by providing a support bar which constitutes a common body for all lamps of the assembly. While this arrangement provides an assembly which may be considered visually pleasing it is restrictive in that apparently it must be factory assembled in view of the complexity of the lens arrangements and moreover since the common body is the support bar then the body must extend the full width of the vehicle even if lamp units are required only adjacent the opposite edges of the vehicle. In such a situation presumably the body intermediate the required lamp units would be closed front and rear by opaque closure members.

BRIEF SUMMARY OF THE INVENTION

It is an object of the present invention to provide a lamp assembly wherein the aforementioned disadvantages are minimized.

In accordance with the present invention there is provided a lamp assembly comprising an elongate support member of hollow section and a plurality of lamp units secured to the support member at points spaced along the length of the support member, electrical connecting leads of the lamp units being disposed in the hollow section of the support member and the lamp units each comprising a body housing the lighting assembly of the unit and having its opposite ends closed by closure members at least one of which is transparent, said closure members of all of the lamp units of the assembly being of similar shape, and the lamp unit bodies being of a common cross-section.

Preferably said lamp units are substantially square in plan view, and said closure members face forwardly and rearwardly respectively.

Desirably the assembly includes at least one further lamp unit the body of which has the same cross-sectional shape as the first mentioned lamp unit bodies, the further lamp unit being positioned in the same plane as the first mentioned lamp units and at one end of the row of units on the support member, but having its closure members facing in directions spaced from the facing directions of the closure members of the first mentioned lamp units, by 90°.

Desirably the assembly includes a second further lamp unit at the opposite outer end of the row of lamp units from the first mentioned lamp unit.

Conveniently said further lamp units have bodies which are shorter than the bodies of the first mentioned lamp units so that the length of the further lamp units, measured between the outer surfaces of the closure members, is less than the equivalent dimension of the first mentioned lamp units.

Desirably all of the lamp unit bodies are of substantially rectangular cross-section.

Preferably all of the lamp unit bodies are appropriate lengths of a common extrusion.

Preferably each lamp unit body is secured to the support member by a single, centrally disposed mounting bolt which passes through the wall of the body and through the wall of the support member.

Desirably both closure members of each of the first mentioned lamp units is transparent.

Conveniently the bolt securing each lamp unit to the support member is hollow, and provides an access path between the hollow section of the support member and the interior of the lamp unit for the connecting leads of the lamp unit.

Preferably all of the connecting leads of the lamp units of the assembly terminate at one part of a plug and socket connector carried at one end of the support member, the other part of the plug and socket connector being connected to the vehicle wiring harness.

Preferably the plug and socket connector defines an end cap at one end of the support member, and the opposite end of the support member is provided with an end cap of equivalent external shape.

Desirably the support member includes mounting means for securing the support member to the roof of a vehicle.

Preferably the support members and each lamp body have interacting formations for locating each body with its longitudinal axis at right angles to the length of the support member.

Desirably said interacting formations comprise at least one rib on the support member or on each lamp body and a pair of spaced location notches carried by each lamp body or by the support member for receiving said rib 16.

Preferably said rib extends lengthwise of the support member and the notches are provided on each lamp body.

Conveniently said notches are formed by respective longitudinally extending ribs integral with the lower wall of the lamp body.

Preferably said support member has a second parallel rib and the ribs of each lamp body each have a second notch to coact with the second rib.

Preferably the spacing between the ribs of each lamp body and the spacing between the ribs of the support member are such that when the lamp body is positioned with its ribs parallel to the ribs of the support member the two sets of ribs can interact to locate a lamp body with its longitudinal axis parallel to the length of the support member.

BRIEF DESCRIPTION OF THE DRAWINGS

The invention will now be described in detail with reference to one example of the invention illustrated in the accompanying drawings wherein:

FIG. 1 is a diagrammatic front elevational view of a lamp assembly for mounting on the roof of a vehicle in accordance with the invention;

FIG. 2 is a top plan view of the assembly seen in FIG. 1,

FIG. 3 is an end view of the assembly seen in FIG. 1,

FIG. 4 is an enlarged top plan view of the support member of the assembly of FIG. 1, FIG. 5 is a cross sectional view taken on line 5—5 of FIG. 4.

DETAILED DESCRIPTION

Figure 6:
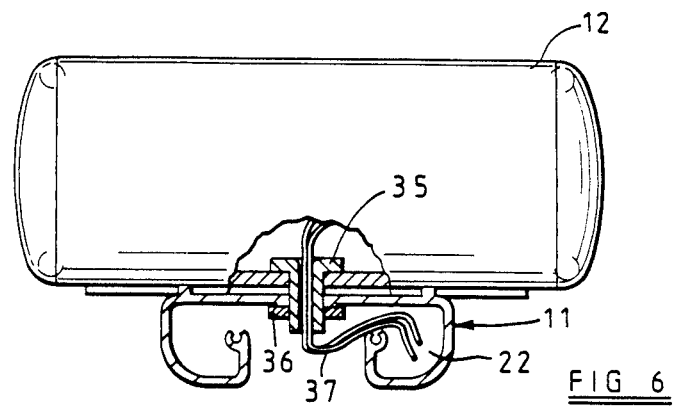
FIG. 6 is a view similar to FIG. 5 but illustrating a lamp unit affixed to the support member, partly in cross-section.
Figure 7:
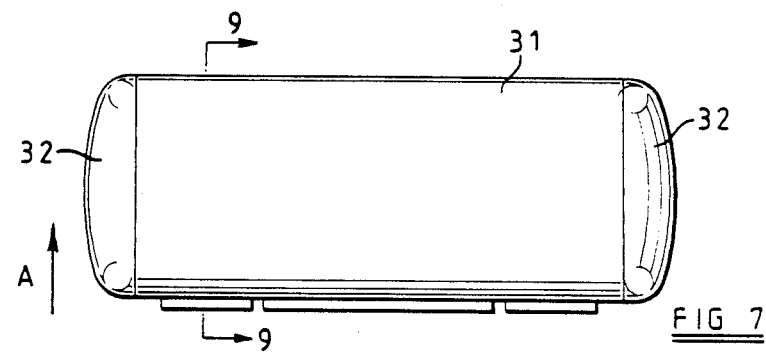
FIG. 7 is a side elevational view of a lamp unit of the assembly of FIG. 1.
Figure 8:
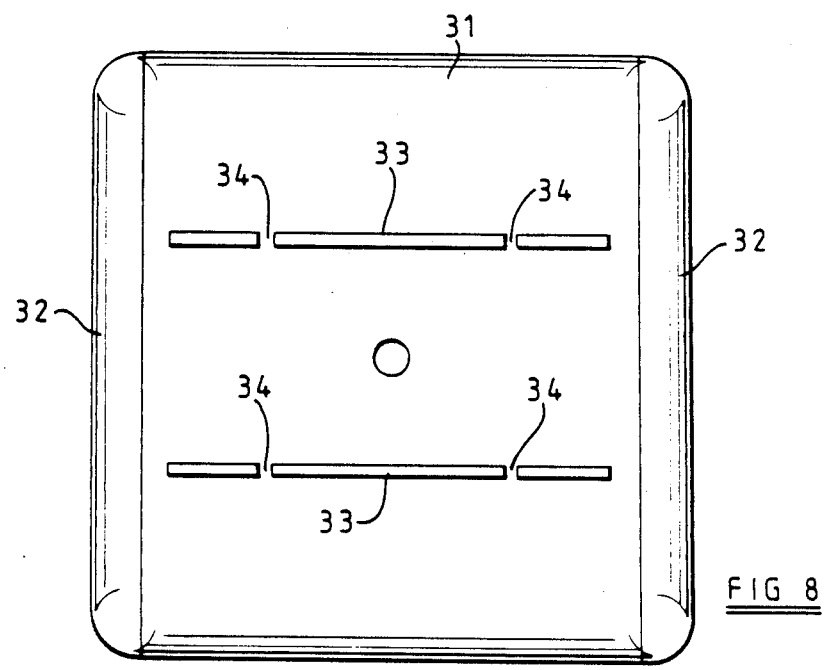
FIG. 8 is a view in the direction of arrow A in FIG. 7.

Referring to the drawings, the lamp assembly, which is intended for use as a roof mounted lamp assembly for an emergency vehicle such as a police car, a motorway service vehicle, or the like, comprises an elongate metal support member 11 carrying a plurality of lamp units 12-17. The arrangement of lamp units illustrated in FIGS. 1 and 2 is symmetrical about the center of the support member 11 but it will be recognized, with reference to the following description, that a wide variety of different lamp unit arrangements may be achieved.

The support member 11 is provided with mounting feet 18 whereby the member 11 carrying the lamp units is secured in position on the roof of a vehicle. The mounting feet 18 may take a wide variety of different forms, and for example, the mounting feet may be of the kind which bolt directly to the roof panel of the vehicle, or alternatively may be of the kind which clamp onto the rain water gutters adjacent the longitudinal edges of the roof panel.

The elongate support member 11 comprises a length of aluminum, of aluminium alloy extrusion having a substantially planar upper surface 19 the marginal edge regions 21 of which extend downwardly, then inwardly, then upwardly so that the member 11 is of hollow cross-section. The shaping of the edge regions of the member 11 provides longitudinal rigidity, and in addition provides a pair of longitudinally extending channels 22. Adjacent its marginal edges the upper surface 19 includes first and second longitudinal extending ribs 23. Both ends of the extrusion are closed by molded synthetic resin end cap units 24, 25 one of which defines an electrical plug and socket connector.

Figure 9:
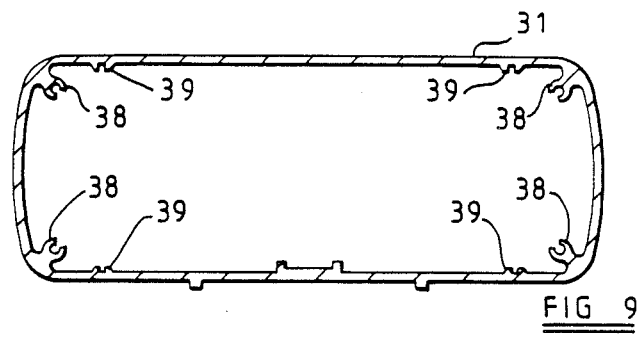
FIG. 9 is a cross sectional view taken on line 9—9 of FIG. 7.
Figure 10:
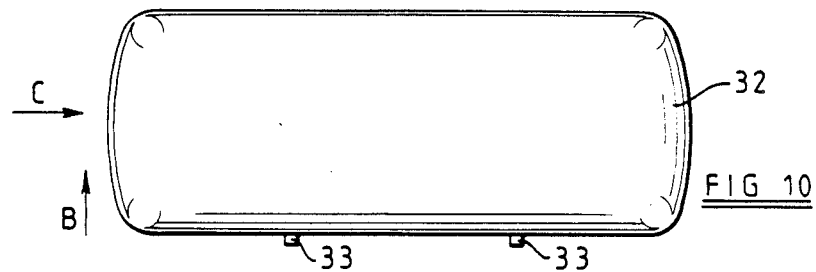
FIG. 10 is a side elevational view of an alternative form of lamp unit.

Each of the lamp units 12-15 is of the same external shape and comprises a body 31 closed at its opposite ends by respective closure members 32. Each body 31 is formed from a length of an aluminum or aluminum alloy extrusion the cross-sectional shape of which is illustrated in FIG. 9. Thus the bodies 31 of the lamp units 12-15 are identical. As is clear from FIG. 9 the cross-sectional shape of each body 31 is substantially rectangular although the side walls have a slight convex curvature to provide a more aesthetically pleasing shape. The closure members 32 of all of the lamp units 12-15 are of identical shape, although they need not be of identical color. It will be recognized therefore that the external shape of each of the lamp units 12-15 is identical.

The lamp units 12-15 are intended to be positioned on the vehicle with their closure members 32 facing forwardly and rearwardly respectively. Thus the forwardly facing closure members will be transparent so that light from lighting assemblies housed within the body 31 of the unit can issue forwardly, and for most applications the rearwardly facing closure members 32 will similarly be transparent so that light from the lighting assembly, or from a second lighting assembly housed within the same body, will issue rearwardly. The color of the closure members will be determined by the function of the lamp unit. For example, on an emergency vehicle such as a police car the closure members 32 of at least one of the lamp units will be blue and the lighting assembly or assemblies of that unit would be arranged to provide a flashing effect. Similarly, on a service vehicle the closure members may be of an amber or yellow color so as to provide the familiar amber or yellow flashing beacon. In some applications red closure members will be used and in others the closure member may be colorless so that a white light is produced. Naturally the lighting assemblies can take a wide variety of different forms, and the closure members and/or the lighting units may include reflector/lens structures to give the desired spread of light.

In order to ensure that the lamp unit may accurately be mounted on the support member with its optical axis at right angles to the support member, the extrusion which is cut to form the body 31 of each lamp unit includes, extending along its lower edge, a spaced pair of parallel ribs 33. After each body 31 is cut from the common length of extrusion the end regions of the ribs 31 are milled away, and transverse slots 34 are milled in the ribs 33. The slot 34 in one rib 33 is aligned with the slot 34 of the adjacent rib 33, and the slots 34 of each rib are spaced apart the same distance as the spacing between ribs 23 on the upper surface of the support member 11. Moreover the slots 34 are just wide enough to accommodate the ribs 23 of the support member and thus when a lamp unit is placed on the support member with its ribs 33 extending transverse to the ribs 23 of the support member the lamp unit will be correctly orientated in relation to the support member when the ribs 23 of the support member are received in the slots 34 of the ribs 33 of the lamp unit body.

A single, centrally disposed bolt 35 (FIG. 6) is used to secure each body 31 to the support member. Preferably each bolt 35 is hollow, and has its shank extending through a centrally disposed aperture in the lower wall of the body 31 and through a correspondingly positioned aperture along the center line of the support member 11. The head of the bolt 35 engages the inner surface of the body 31 and a nut 36 engaged with the shank of the bolt 35 engages the under surface of the upper wall of the support member 11. The passage through the bolt 35 thus provides an access path between the interior of the lamp unit body 31 and the hollow section of the support member 11 whereby electrical connecting leads 37 of the lamp unit can be led from the lighting assembly or assemblies of the lamp units to the hollow section of the support member 11.

The closure members 32 are each secured to their respective body 31 by four self-tapping screws (not shown) which extend through apertures in the closure member, and engage integral mounting lugs 38 of the body extrusion. A sealing gasket (not shown) may be interposed between the ends of the body 31 and their respective closure members. The body extrusion further includes location members 39 for supporting and locating one more lighting assemblies within the body 31.

It will be recognized that the lamp units 16 and 17 illustrated in FIGS. 1 and 2 differ in size and orientation from the lamp units 12-15. Whereas the lamp units 12-15 have their optical axes aligned with the length of vehicle and transverse to the longitudinal axis of the support member 11, the lamp units 16, 17 have their optical axes transverse to the length of the vehicle and aligned with the longitudinal axis of the support member. Moreover, the length of the lamp units 16, 17 (that is to say the dimension measured between the outer faces of the closure members) is less than the length of the units 12-15.

Figure 11:
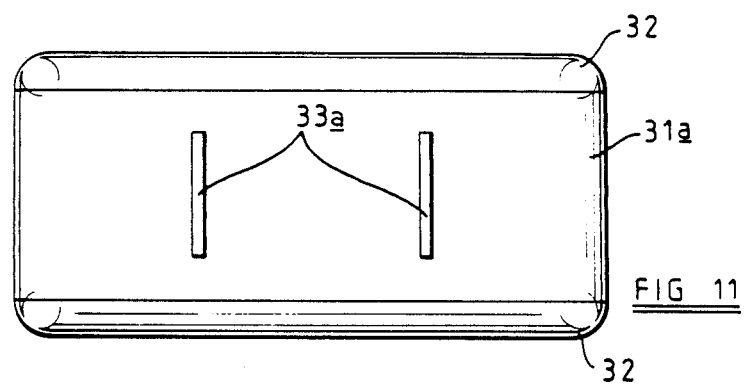
FIG. 11 is a view in the direction of arrow B in FIG. 10.
Figure 12:
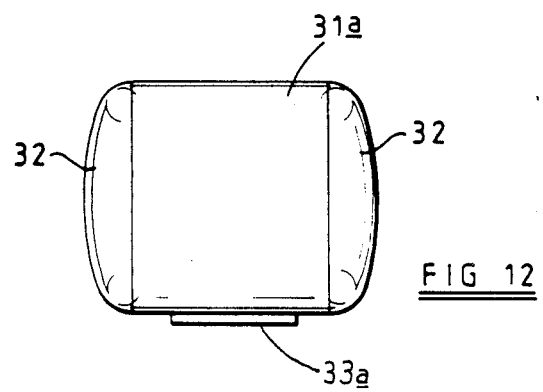
FIG. 12 is a view in the direction of arrow C in FIG. 10.

Each of the units 16, 17, like the units 12-15, comprises a body 31a (FIGS. 11, 12) closed at opposite ends by closure members 32. The closure members 32 are of identical shape to the closure members 32 of the units 12-15, and the body 31a is of identical cross-section to the bodies 31 of the units 12-15. Indeed, the body 31a is cut from the same extrusion as the bodies 31, but the length of the body 31a is shorter than the length of the body 31 by an amount such that conveniently the length of each unit 16, 17 is half the length of one of the units 12-15. However it will be understood that it is not essential for the length to be half of the length of a unit 12-15 and other fractions could be closen.

The ribs 33a of the extrusion constituting the body 31a again serve to faciliate accurate positioning of the units 16, 17 on the support member 11. However, because the orientation of the body 31a is at right angles to the orientation of each of the bodies 31 the ribs 33a of the bodies 31a will extend parallel to the ribs 23 of the support member 11. Thus the ribs 33a are spaced apart by a distance such that the outer faces of the ribs 33a fit closely between the inner faces of the ribs 23. This of course is of no significance in the bodies 31, but when considering the bodies 31a it will be recognized that the interaction of the ribs 23, 33a ensures accurate alignment of the bodies 31a at 90° to the bodies 31. If desired of course the ribs 33 of the bodies 31 could be used in the same manner to locate the bodies 31 with their optical axes parallel to the length of the support member. This would be useful if, for example, units 16 were used at the ends of the members 11.

Each of the units 16, 17 will include a lighting assembly as discussed above, and the outermost closure member 32 will be transparent. However, since the innermost closure member of each of the units 16, 17 abuts, or at least is presented to, the side wall of the adjacent unit 13, 15 then it is pointless for this closure member to be transparent since there is no necessity for light to issue from the innermost end of the unit. Conveniently therefore the innermost closure members 32 of the units 16, 17 will be opaque. The color chosen for the outermost closure members 32 of the units 16, 17 will again depend upon the application for which the lighting unit is designed.

The electrical connecting leads 37 of all the lamp units 12-17 are led along one or both of the channels 22 of the support member 11 towards one end of the support member 11. At the chosen end of the support member 11 each of the leads 37 is electrically connected to a respective terminal in one part of a plug and socket connector (not shown). The plug and socket connector is externally shaped to define an aesthetically pleasing end cap for the support member 11 and that component of the plug and socket connector which is not connected directly to the leads 37 is connected to the wiring harness of the vehicle. Thus the plug and socket connector defining one end cap (24 or 25 in FIG. 4) is used to effect the electrical connection between the wiring harness of the vehicle and the lamp units. The opposite end cap is externally identical to the end cap constituting the plug and socket connector, but of course there is no need for this end cap to function as a plug and socket connector. The end caps can be secured in position by self tapping screws extending into lugs 21a forming integral parts of the extrusion defining the support member 11.

It will be understood that while it is preferred for the locating formations on the support member and the lamp bodies to be defined by the parallel ribs 23 on the member 11 and the parallel ribs 33 on the lamp bodies, it would be possible to use a single rib 23 on the member 11 coacting with a pair of ribs 33 on each body, or a single rib 33 on each body coacting with the pair of ribs 23 on member 11.

It will be recognized that a wide variety of different arrangements of lamp units can be provided on the support bar 11 and there is no fundamental necessity to utilize half size units such as the units 16 and 17. If desired "full-size" units equivalent to the units 12-15 could be used in place of the units 16, 17.

If desired lamp units may be mounted (stacked) on top of other units, the upper wall of a unit body being drilled as necessary to receive the mounting bolt of a unit stacked on top. The connecting leads of a stacked unit will pass through the lower unit or units and their mounting bolts to enter the support bar. Moreover lamp unit bodies may serve as anchor points for radio antenae and the like.

It will be recognized that a wide variety of different arrangements can be produced with a minimum of components. For example, since the bodies of all of the lamp units are cut from the same extrusion then it is not necessary to stock a wide variety of different lamp unit bodies. While it may not be practical for the end user to cut the extrusion to the appropriate length, he need only stock one, or two different lamp bodies. Moreover, the closure members can be produced extremely economically, since the same molding tool can be used to produce a wide variety of closure members of different color. The opaque closure member can also be produced from the same tools. The lighting assemblies of the lamp units can also be common, differing only in that some may have timers incorporated therein to effect flashing.

Furthermore it will be recognized that the geometric relation between all of the lamp units provides an aesthetically pleasing assembly while at the same time providing a wide variety of different arrangements of lamp unit. The low profile of the lamp units blends with current vehicle styling, and is believed to exhibit minimal aerodynamic drag.

What is claimed is:

1. A lamp assembly comprising an elongate support member having a hollow cross section, and a plurality of lamp units secured to said support member at positions spaced along the length of said support member, electrical connecting leads of said lamp units being disposed in the hollow interior of said support member, said lamp units each comprising a body housing a lighting assembly of the unit and having opposite ends, and closure members closing said opposite ends, at least one of said closure members being transparent, said closure members of all of said lamp units of the assembly being of similar shape, and said lamp unit bodies having the same cross-sectional shape.

2. A lamp assembly as claimed in claim 1 wherein each lamp unit is substantially square in plan view, and said closure members of each lamp unit face substantially oppositely relative to each other.

3. A lamp assembly as claimed in claim 2 and further comprising at least one further lamp unit having a body of the same cross-sectional shape as the first mentioned lamp unit bodies and having opposite ends, said at least one further lamp unit being positioned in substantially the same plane as the first mentioned lamp units and at one end of the row of first mentioned lamp units on said support member, and closure members on said ends of said body of said at least one further lamp unit facing in directions substantially traverse to the facing directions of said closure members of the first mentioned lamp units.

4. A lamp assembly as claimed in claim 3 and further comprising a second said further lamp unit at the opposite end of said row of units on said support member.

5. A lamp assembly as claimed in claim 4 wherein said further lamp units have bodies which are shorter than the bodies of the first mentioned lamp units so that the length of said further lamp units, measured between the outer surfaces of said closure members thereof, is less than the length of the first mentioned lamp units measured between the outer surfaces of said closure members thereof.

6. A lamp assembly as claimed in claim 1 wherein all of the lamp unit bodies have a substantially rectangular cross-section.

7. A lamp assembly as claimed in claim 1 wherein all of the lamp unit bodies are appropriate lengths of a common extrusion.

8. A lamp assembly as claimed in claim 1 wherein each lamp unit body is secured to said support member by a single, centrally disposed mounting bolt which passes through a wall of the body and through a wall of said support member.

9. A lamp assembly as claimed in claim 8 wherein said bolt securing each lamp unit to said support member is hollow, and provides an access path between the hollow interior of said support member and the interior of said lamp unit for connecting leads of said lamp unit.

10. A lamp assembly as claimed in claim 1 wherein a plug and socket connector is carried at one end of said support member and connecting leads of said lamp units of the assembly terminate at one part of said plug and socket connector, said plug and socket connector having another part connectable to a vehicle wiring harness.

11. A lamp assembly as claimed in claim 10 wherein said plug and socket connector defines a first end cap at one end of said support member, and the opposite end of said support member is provided with a second end cap having an external shape equivalent to the external shape of said first end cap.

12. A lamp assembly as claimed in claim 1 wherein said support member further comprises mounting means for securing said support member to a roof of a vehicle.

13. A lamp assembly as claimed in claim 1 wherein said closure members of each of said lamp units is transparent.

14. A lamp assembly as claimed in claim 1 wherein said support member and each lamp body have interacting formations for positioning each lamp body in a predetermined orientation relative to said support member.

15. A lamp assembly as claimed in claim 14 wherein said interacting formations comprise at least one rib on one of said support member and lamp body and a pair of cooperating spaced positioning notches on the other of said lamp body and support member for receiving said at least one rib.

16. A lamp assembly as claimed in claim 15 wherein said at least one rib extends longitudinally on said support member and said notches are on each lamp body.

17. A lamp assembly as claimed in claim 16 wherein said notches are formed in respective ribs integral with a wall of said lamp body and extending substantially transversely to said at least one rib on said support member.

18. A lamp assembly as claimed in claim 17 wherein said support member has a second rib extending parallel to said at least one rib and said ribs on each lamp body each have a second notch therein to receive said second rib.

19. A lamp assembly as claimed in claim 14 wherein said interacting formations comprise a set of spaced ribs on each lamp body and a set of spaced ribs on said support member, each set of ribs being relative spaced so that when said lamp body is positioned with the ribs thereon parallel to said ribs on said support member, the two sets of ribs interact cooperatively to position said lamp body in said predetermined orientation.

20. A lamp assembly as claimed in claim 1 wherein said support member has an upper surface and a pair of parallel longitudinally extending ribs on said upper surface and said body of said at least one further lamp unit has a lower surface and a pair of parallel ribs extending on said lower surface, so that when said at least one further lamp unit is positioned on said support member with all ribs parallel said ribs on said body of said at least one further lamp unit coact with the ribs on said support member to locate said at least one further lamp unit with its optical axis parallel to the length of said support member.

* * * * *